(12) United States Patent
Chen

(10) Patent No.: US 7,423,229 B2
(45) Date of Patent: Sep. 9, 2008

(54) LIGHT GUIDING PLATE AND A KEYSTROKE MODULE FOR USE THEREWITH

(75) Inventor: Ko-Ju Chen, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 70 days.

(21) Appl. No.: 11/560,947

(22) Filed: Nov. 17, 2006

(65) Prior Publication Data

US 2008/0117651 A1      May 22, 2008

(51) Int. Cl.
*H01H 9/00* (2006.01)
(52) U.S. Cl. .................................. 200/314; 200/341
(58) Field of Classification Search ......... 200/310–314, 200/341–345; 362/629, 582; 385/129–132, 385/14
See application file for complete search history.

(56) References Cited

U.S. PATENT DOCUMENTS

| | | | |
|---|---|---|---|
| 5,053,928 A | 10/1991 | Pasco | |
| 5,083,240 A | 1/1992 | Pasco | |
| 5,746,493 A | 5/1998 | Jonsson et al. | |
| 6,422,712 B1 | 7/2002 | Nousianen et al. | |
| 6,592,233 B1 | 7/2003 | Parikka | |
| 6,665,931 B2 * | 12/2003 | Yamaguchi et al. | ........... 29/850 |
| 6,676,268 B2 | 1/2004 | Ohkawa | |
| 6,746,129 B2 | 6/2004 | Ohkawa | |
| 6,755,582 B2 * | 6/2004 | Won | ............... 400/490 |
| 6,805,490 B2 | 10/2004 | Levola | |
| 6,834,973 B2 | 12/2004 | Ohkawa | |
| 6,836,303 B2 * | 12/2004 | Kim | ................. 349/65 |
| 6,926,418 B2 | 8/2005 | Östergård et al. | |
| 6,979,112 B2 | 12/2005 | Yu et al. | |
| 6,991,359 B2 | 1/2006 | Leu et al. | |
| 2001/0028549 A1 * | 10/2001 | Suganuma et al. | ........ 361/683 |
| 2006/0268578 A1 * | 11/2006 | Zhu et al. | ............... 362/618 |

* cited by examiner

*Primary Examiner*—Michael A Friedhofer
*Assistant Examiner*—Lisa N Klaus

(57) ABSTRACT

A keystroke module for use with a light guiding plate includes a contacting and controlling layer, a light guiding plate and a light source. The contacting and controlling layer has a pressing side and a contacting and light guiding side. The light guiding plate is arranged under the contacting and light guiding side of the contacting and controlling layer and further includes a light auxiliary layer and a light inducting layer, which is a soft piece body having a reflecting side, on which plural light guiding parts are arranged, while the auxiliary light layer is a hard transparent piece body that is laminated correspondingly above the reflecting side of the light inducting layer. In addition, the light source is arranged at one side of the light guiding plate for irradiating light from the light auxiliary layer, then the light being reflected out by the reflecting side and the light guiding parts of the light inducting layer; thereby, it is possible to prevent the components contacted with the light inducting layer of the light guiding plate from easy wearing and permanent deforming, and the using lifetime of the light guiding plate or the keystroke module may be prolonged significantly.

17 Claims, 3 Drawing Sheets

LIGHT GUIDING PLATE AND A KEYSTROKE MODULE FOR USE THEREWITH

BACKGROUND OF THE INVENTION

1. Field of the Invention

The present invention generally relates to a light guiding plate and a keystroke module for use therewith, in particular, to a light guiding plate and a keystroke module that are used for electronic devices.

2. Description of Prior Art

Following the progress and development of technology, electronic devices, for example, mobile phone, personal digital assistant, and so on, have become necessary information appliances used by modern people. All these electronic devices have keystroke module, with which information transmission between the user and the electronic device may be provided, or with which various functions of electronic device may be executed. In addition, in order to provide user to operate each key button of keystroke module under dark circumstance, a light guiding plate and a light source are disposed in the keystroke module, whereby the light source emits out light, which is then reflected by the light guiding plate in a way, such that a user can clearly identify each key button's position, figure, and number in the darkness. According to aforementioned arrangements, the key pressing operation may be easily executed, and the using function endowed to the electronic device may be further enhanced significantly.

The keystroke module according to the prior arts mainly includes: a contacting and controlling layer, a light guiding plate, and a light source, wherein the contacting and controlling layer has a pressing side and a contacting and light guiding side; the light guiding plate is arranged under the contacting and light guiding side of the contacting and controlling layer and has a hard plate body, side of which is formed as an incident side, and top side of which is formed as an emitting side, under which a reflecting side is formed correspondingly; the light source is arranged at one side of the light guiding plate for irradiating light from the incident side, then the irradiated light is reflected by the reflecting side of the light guiding plate, and finally, the light is emitted out from the emitting side; thereby, a keystroke module is constituted.

However, in the keystroke module of the prior arts, following drawbacks are still existent under practical application: first of all, since its light guiding plate is a hard plate body, so it is easy for each component contacted with the light guiding plate to generate wearing damage under the pressing operation of longtime and high frequency, besides the touching feeling of keystroke being very poor; second, a spring membrane, having plural metallic springs, is usually arranged under the light guiding plate, and its surface easily generates plastic deformation, after being frequently contacted and pressed by the light guiding plate, the using lifetime of light guiding plate or keystroke module being significantly shortened; third, in order to reach an excellent effect of reflection for the light guiding plate, its thickness is difficult to be minimized, which is further contradictory to the pursuing advantages of the common electronic devices—lightness, thinness, shortness, and smallness—not only the assembly and connection for each component are tedious and inconvenient, but also the material cost of components can not be reduced effectively. All these drawbacks are needed to be solved urgently.

SUMMARY OF THE INVENTION

The present invention is to provide a light guiding plate and a keystroke module for use therewith; during the pressing operation of the fingers, it is uneasy for the surface of the light guiding plate to generate quick wearing; in the meanwhile, it is also uneasy for the components contacted with the bottom side of the light guiding plate to generate locally permanent deformation; thereby, the using lifetime of the light guiding plate or the keystroke module is prolonged significantly.

The present invention is to provide a light guiding plate and a keystroke module for use therewith, which not only can improve the touching feeling of the contacting and controlling layer, but also can be assembled more easily and more conveniently due to the thinner thickness thereof.

The present invention is to provide a light guiding plate, which includes a light auxiliary layer and a light inducting layer, which is a soft piece body having a reflecting side, on which plural light guiding parts are arranged, while the light auxiliary layer is a hard transparent piece body, which is laminated correspondingly above the reflecting side of the light inducting layer.

The present invention is to provide a keystroke module, which includes a contacting and controlling layer, a light guiding plate and a light source, wherein the contacting and controlling layer has a pressing side and a contacting and light guiding side formed under the pressing side; the light guiding plate is arranged under the contacting and light guiding side of the contacting and controlling layer and further includes a light auxiliary layer and a light inducting layer, which is a soft piece body having a reflecting side, on which plural light guiding parts are arranged, while the light auxiliary layer is a hard transparent piece body that is laminated correspondingly above the reflecting side of the light inducting layer; in addition, the light source is arranged at one side of the light guiding plate for irradiating light from the light auxiliary layer, then the light being reflected out by the reflecting side and the light guiding parts of the light inducting layer.

BRIEF DESCRIPTION OF DRAWING

The features of the invention believed to be novel are set forth with particularity in the appended claims. The invention itself, however, may be best understood by reference to the following detailed description of the invention, which describes certain exemplary embodiments of the invention, taken in conjunction with the accompanying drawings, in which:

DETAILED DESCRIPTION OF THE INVENTION

In cooperation with attached drawings, the technical contents and detailed description of the present invention will be as follows.

Figure 1:
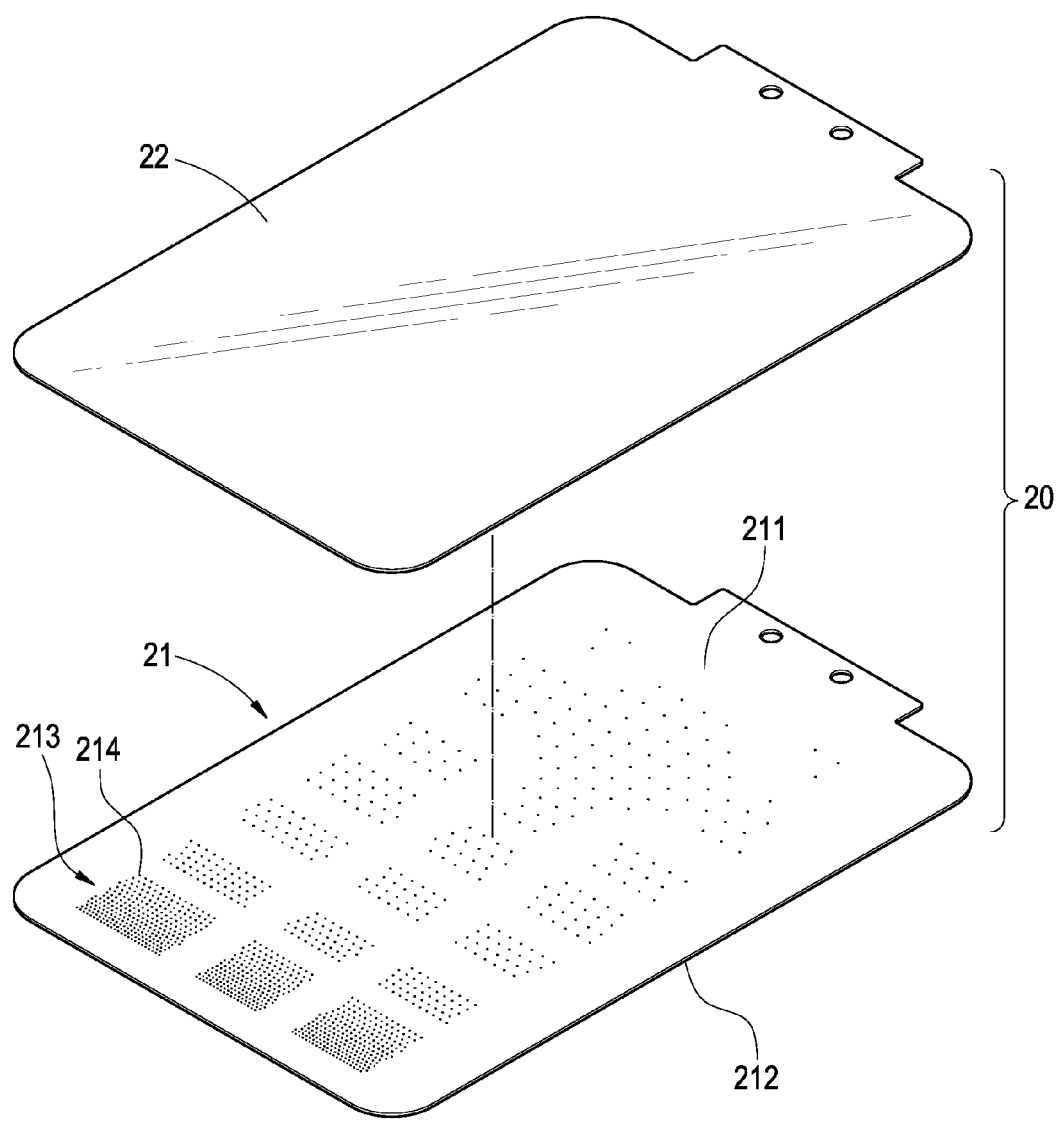
FIG. 1 is a perspective explosion view of the light guiding plate according to the present invention.
Figure 2:
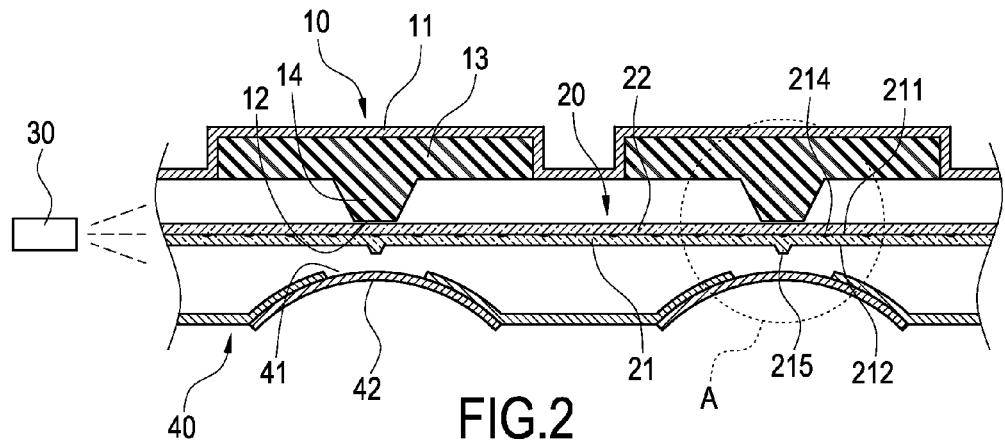
FIG. 2 is an assembling illustration of the keystroke module according to the present invention.
Figure 3:
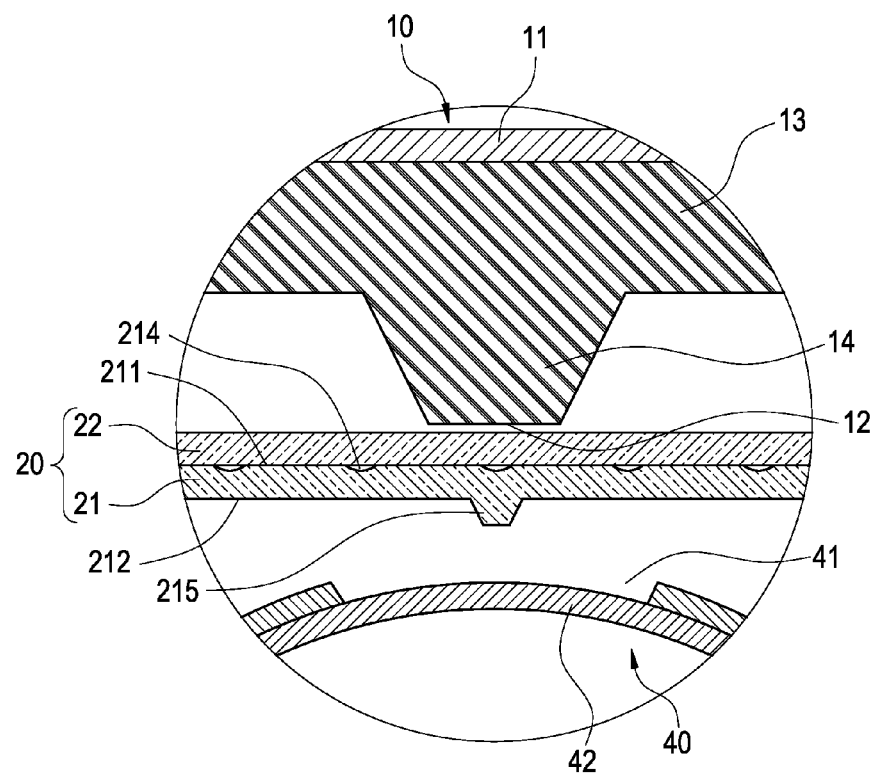
FIG. 3 is a partial enlargement view of the A area indicated in FIG. 2.

Please refer to FIG. 1 through FIG. 3, which separately are a respective explosion view of the light guiding plate and an assembling illustration of the keystroke module according to the present invention, and partial enlargement view of the A area indicated in FIG. 2. The present invention is to provide a light guiding plate and a keystroke module for use therewith, the keystroke module mainly comprising a contacting and controlling layer 10, a light guiding plate 20, and a light source 30, wherein:

The contacting and controlling layer 10 is made of the material of polycarbonate (PC) and has a pressing side 11 and a contacting and light guiding side 12 formed under the pressing side 11. In this embodiment, plural protrusive key buttons 13 are formed at intervals on the pressing side. Corresponding to the center of each key button 13, a contacting and controlling protrusion 14 is separately formed underneath. Said contacting and light guiding side 12 is formed on the bottom side of the contacting and controlling protrusion 14.

The light guiding plate 20 is arranged under the contacting and light guiding side 12 of the contacting and controlling layer 10 and includes a light inducting layer 21 and a light auxiliary layer 22. The light inducting layer 21 is a soft piece body made of silicone and has a reflecting side 211 and a bottom side 212 formed under the reflecting side 211. Corresponding to each key button 13, plural interval sections 213 are arranged separately underneath. One or more light guiding part 214 is separately arranged in each interval section 213. The light guiding part 214 may be a semi-spherical recession as shown in this embodiment. Its diameter size is between 0.01 mm and 0.1 mm. The distribution density of the recession in each interval section 213 is between 1 dot/mm$^2$ and 20 dot/mm$^2$. In addition, corresponding to the contacting and controlling protrusion 14 of the contacting and controlling layer 10, plural signal convex dots 215 are formed and extended downwardly from the bottom side of the light inducting layer 21, as shown in FIG. 3.

The light auxiliary layer 22 is a hard transparent piece body made of any one material of thermoplastic polyurethane elastomer (TPU), polycarbonate (PC), polymethyl methacrylate (PMMA) or polyethylene terephthalate (PET), etc. and is correspondingly laminated above the reflecting side 211 of the light inducting layer 21. The laminating combination between the light auxiliary layer 22 and the light inducting layer may be processed by the thermally pressing method or the glue adhesive method.

The light source 30 is arranged at one side of the light guiding plate 20 and may be a light emitting diode (LED). The distribution density of the light guiding part 214 of each interval section 213 in the light inducting layer 21 is thinner, when its distance to the light source 30 is closer, and the distribution density of the light guiding part 214 is denser, when it is farther away the light source 30. The light source 30 emits light from the side of the light auxiliary layer 22, then the incident light being reflected out from the reflecting side 211 and the light guiding part 214 of the light inducting layer 21.

Furthermore, the keystroke module according to the present invention also includes a spring membrane 40, which is correspondingly arranged under the light guiding plate 20. The spring membrane 40 may be made of the material of polyethylene terephthalate (PET), on which plural openings 41 are arranged. Corresponding to each signal convex dot 215 of the light guiding plate 20, a metallic spring 42 is arranged in the opening 41 for providing an interconnecting action to the signal convex dot 215.

Figure 4:
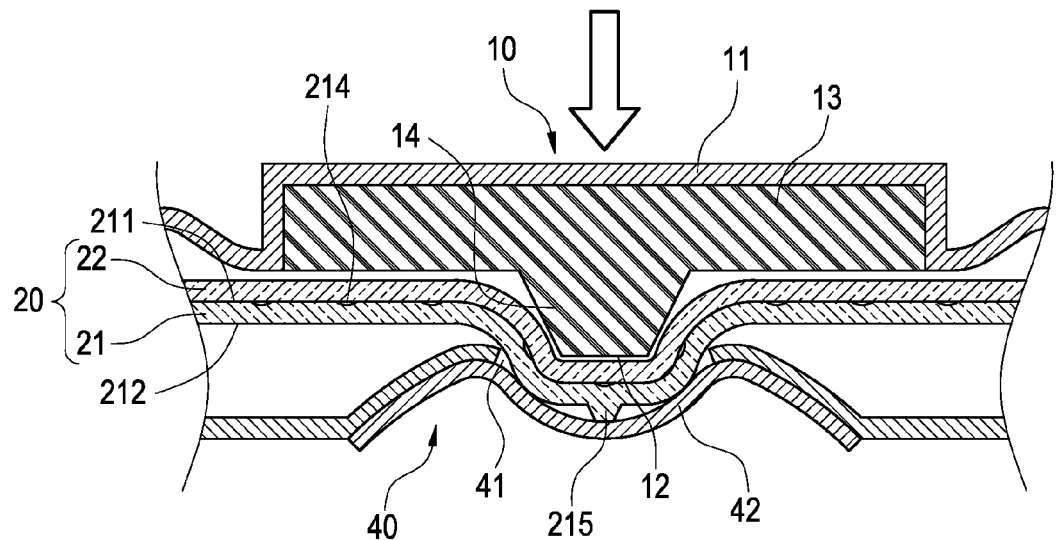
FIG. 4 is a cross-sectional view of the keystroke module, under using state, according to the present invention.

Please refer to FIG. 4, which shows a cross-sectional view of the keystroke module, under using state, according to the present invention. When the keystroke module is under being used, a human finger presses down the key button 13 of the contacting and controlling layer 10, then the contacting and controlling protrusion 14 will follow the key button 13, move downwardly, and abut against the light auxiliary layer 22 of the light guiding plate 20. In the meanwhile, the local area of the light auxiliary layer 22 and the light inducting layer 21 will be moved downwardly and deformed. The signal convex dot 215 disposed at the bottom side of the light inducting layer 21 will be abutted against the metallic spring 42 of the spring membrane 40 for opening or closing the signal of a switch unit (not shown in the figure) arranged in the metallic spring 42 through the elastic deformation of the metallic spring 42.

Figure 5:
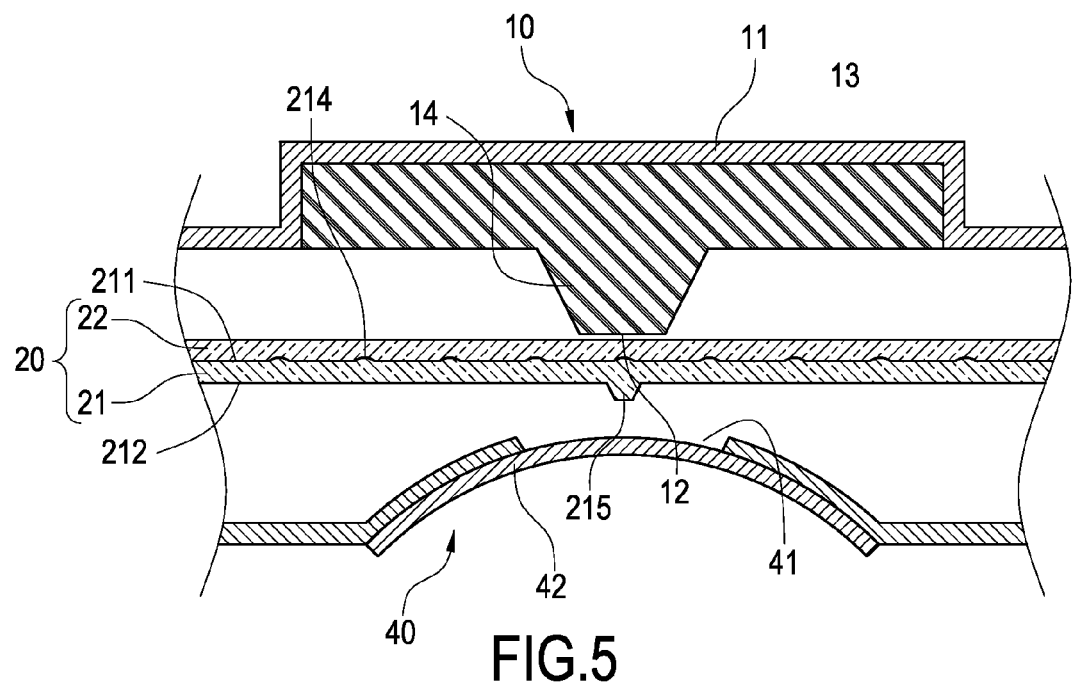
FIG. 5 is an assembling and cross-sectional view of another embodiment of the keystroke module according to the present invention.

Please further refer to FIG. 5, which shows an assembling and cross-section view of another embodiment of the keystroke module according to the present invention. Except for the configurations described in abovementioned embodiment, the light guiding part 214 of the reflecting side 211 in the light inducting layer 21 may be configured as a protruding particle formed upon the reflecting side 211 for scattering the light that is irradiated from the light source 30 and incident into the light auxiliary layer 22, whereby the uniformity of the light beam emitted out from the light guiding plate 20 may be enhanced significantly.

According to the light guiding plate and the keystroke module for use therewith according to the present invention, following advantages are substantially provided: first, since the hard light auxiliary layer 22 is provided for the pressing operation of human fingers, so it is uneasy to occur a quick wearing phenomenon on the surface of the light guiding plate 20; second, because of the soft characterization of the soft light inducting layer 21, the inter-contacting action, applied to the metallic spring 42 by the soft light inducting layer 21, can prevent the metallic spring 42 from being worn or deformed permanently after it being pressed down to generate deformation, whereby the using lifetime of the light guiding plate 20 may be prolonged significantly. Through the application of the light guiding plate 20, which is constituted by the soft light inducting layer 21 and the hard light auxiliary layer 22, not only the pressing feeling of the key button 13 of the contacting and controlling layer 10 may be improved, but also it is easier and more convenient for assembly or integration due to thinner thickness of the contacting and controlling layer 10 and the spring membrane 40.

In summarizing aforementioned description, it should be noted that the light guiding plate and the keystroke module for use therewith according to the present invention have already possessed the applicability, the innovation, and the progressiveness of industry, besides its structure having not been seen in current market and having not been applied in public so far, according to the patent law, this application proposed under the present invention completely fulfilling the applying merits of new patent.

Aforementioned structures are only preferable embodiments according to the present invention, being not used to limit its executing scope. Any equivalent variation and modification made according to appended claims is all covered by the claims claimed by the present invention.

What is claimed is:

1. A light guiding plate, comprising:
   a light inducting layer, which is a soft piece body and has a reflecting side, on which plural light guiding parts are arranged for reflecting light out; and
   a light auxiliary layer, which is a hard piece body and is laminated correspondingly above the reflecting side of the light inducting layer.

2. The light guiding plate according to claim 1, wherein the light inducting layer 21 is made of the material of silicone.

3. The light guiding plate according to claim 1, wherein the laminating integration between the light inducting layer and the light auxiliary layer is processed by thermally pressing method.

4. The light guiding plate according to claim 1, wherein the laminating integration between the light inducting layer and the light auxiliary layer is processed by glue adhesive method.

5. The light guiding plate according to claim 1, wherein the light guiding part of the light inducting layer is a protruding particle formed on the reflecting side.

6. The light guiding plate according to claim 1, wherein the light guiding part of the light inducting layer is a recessing pit formed on the reflecting side.

7. The light guiding plate according to claim 1, wherein plural signal convex dots are formed and extended downwardly from the bottom side of the light inducting layer.

8. The light guiding plate according to claim 1, wherein the light auxiliary layer is made of any one material of TPU, PC, PMMA or PET.

9. A keystroke module, comprising:
a contacting and controlling layer having a pressing side and a contacting and light guiding side formed under the pressing side;
a light guiding plate arranged under the contacting and light guiding side of the contacting and controlling layer and having a light auxiliary layer and a light inducting layer, which is a soft piece body having a reflecting side, on which plural light guiding parts are arranged, while the auxiliary light layer is a hard transparent piece body that is laminated correspondingly above the reflecting side of the light inducting layer; and
a light source arranged at one side of the light guiding plate for irradiating light from the light auxiliary layer, then the light being reflected out by the reflecting side and the light guiding parts of the light inducting layer.

10. The keystroke module according to claim 9, wherein the light inducting layer is made of the material of silicone.

11. The keystroke module according to claim 9, wherein the laminating integration between the light inducting layer and the light auxiliary layer is processed by thermally pressing method.

12. The keystroke module according to claim 9, wherein the laminating integration between the light inducting layer and the light auxiliary layer is processed by glue adhesive method.

13. The keystroke module according to claim 9, wherein the light guiding part of the light inducting layer is a protruding particle formed on the reflecting side.

14. The keystroke module according to claim 9, wherein the light guiding part of the light inducting layer is a recessing pit formed on the reflecting side.

15. The keystroke module according to claim 9, wherein the light auxiliary layer is made of any one material of TPU, PC, PMMA or PET.

16. The keystroke module according to claim 9, further includes a spring membrane arranged correspondingly under the light guiding plate.

17. The keystroke module according to claim 16, wherein plural metallic springs are arranged on the spring membrane and plural signal convex dots corresponding to the metallic springs are formed and extended downwardly from the bottom side of the light inducting layer.

* * * * *